United States Patent Office 3,041,279
Patented June 26, 1962

3,041,279
LUBRICATING OIL COMPOSITIONS
George M. Calhoun and Hyman Diamond, Berkeley, Calif., assignors to Shell Oil Company, a corporation of Delaware
No Drawing. Filed Dec. 7, 1959, Ser. No. 857,486
8 Claims. (Cl. 252—32.7)

This invention relates to improved organic compositions and, more particularly, to those which are highly resistant to oxidative attack even when subjected to elevated temperatures and pressures.

Many organic materials such as fuels, lubricating oils, greases, waxes, asphalts and synthetic resins have been developed for the above-stated purpose. In general, these products employ a variety of phenolic or aromatic amine oxidation inhibitors. Compounded compositions of this type, although effective under moderate temperature and pressure conditions, are relatively ineffective at high temperatures and pressures, resulting in the breakdown and formation of sludge and solid deposits which are undesirable because they cause wear and damage. Recently, attempts have been made to overcome this defect and improve not only the oxidation stability of organic materials such as the oils but other properties as well by combining well known anti-oxidants (phenols and amines) with certain non-ash forming organic compounds such as nitrogen-containing polymers. However, any synergism which such combinations display with respect to oxidation stability is of short duration.

It has now been discovered that the oxidative stability of organic materials, such as petroleum products, containing phenolic anti-oxidants (A) can be greatly enhanced and the overall properties of such compounded materials substantially improved by the addition thereto of a small amount of certain 2-thiaphosphono compounds (B). The phenolic compounds (A) whose anti-oxidant properties are so increased have the formula

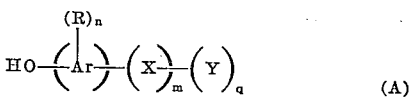

(A)

wherein Ar is an aromatic group having attached to ring carbons of hydroxyl group (—OH) and a $C_{1-8}$ alkyl radical (R), X is selected from the group consisting of —CR'H, oxygen or sulfur, Y is selected from the group consisting of hydrogen,

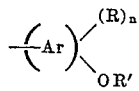

—OR' and —NR'$_2$ wherein R' is hydrogen or a $C_{1-4}$ alkyl radical, n is an integer of at least 1, preferably 2, and m and q are each zero or 1. The amounts of each additive required to cause this improvement are small, generally about 0.01–5% and preferably about 0.1–2% by weight.

The 2-thiaalkyl phosphono compounds (B) are oil-soluble and have the general formula

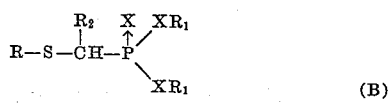

(B)

wherein R is an oil-soluble hydrocarbyl group, such as an alkyl, aryl, aralkyl, alkaryl, or cycloalkyl radical having at least 6 and preferably a straight-chain alkyl radical having from 10 to 18 carbon atoms, the R$_1$'s are the same or different groups selected from hydrogen, hydrocarbyl, or cationic groups, such as metallic or non-metallic cationic groups, such as mono- or polyvalent metal or amine, preferably an alkylamine, R$_2$ is hydrogen or a $C_{1-4}$ alkyl radical and the X's are independently chalcogen atoms having an atomic number of from 8 to 16, that is, oxygen or sulfur.

The oil-soluble phenolic compounds represented by Formula A include simple alkyl phenols and alkyl-substituted bisphenols, the preferred class being a p,p'-methylene bisphenol or monoether thereof represented by the formula

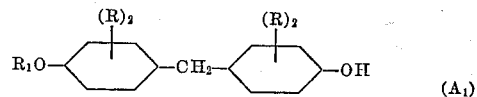

(A$_1$)

where the R's are $C_4$–$C_8$ tertiary alkyl groups preferably in the 2,6 position and R$_1$ is hydrogen or a $C_1$–$C_{10}$ alkyl, alkylol, or a cycloalkyl radical.

The oil-soluble alkyl monophenols include polyalkyl phenols such as 2,6-ditertbutylphenol,
2-isopropyl-1-naphthol 2,4,6-triethyl-,
tributyl-,
trioctyl-,
2,4-di-tert-butyl-6-methyl-,
2,6-di-tert-butyl-4-methyl-,
2,4,6-tri-tert-butyl-,
2,6-dicyclohexyl-4-methyl-,
2,6-dimethyl-4-cyclohexyl-,
2,6-di-tert-butyl-4-methylol phenol,
2,4-dicyclohexyl-6-methylol phenol,
3,5-dialkyl-4-hydroxy-benzylamines, such as N,N-dimethyl-N-(3,5-di-tert-butyl-4-hydroxy benzyl)amine, N-methyl-N,N-bis(3,5-diisopropyl-4-hydroxybenzyl)amine. The bisphenols include:

3,3',5,5'-tetra-isopropyl-4,4'-dihydroxydiphenyl,
3,3'-dimethyl-5,5'-ditert-amyl-4,4'-dihydroxydiphenyl;
1,1-bis(3,5-ditert-butyl-4-hydroxyphenyl) methane;
1,1-bis(3,5-diisopropyl-4-hydroxyphenyl)methane;
1,1-bis(3,5-di-sec-butyl-4-hydroxyphenyl)methane;
1,1-bis(3-isopropyl-5-tert-butyl-4-hydroxyphenyl)methane;
1,1-bis(3,5-di(2-octyl)-4-hydroxy-phenyl)methane;
1,1-bis(3-sec-butyl-5(2-hexyl)4-hydroxyphenyl)methane;
1,1-bis(3-isopropyl-5-(1,1,3,3-tetramethylbutyl)4-hydroxyphenyl)methane;
1,1-bis(3-tert-butyl-5-methyl-2-hydroxyphenyl)methane;
1,1-bis(3-tert-butyl-5-methyl-2-hydroxyphenyl)ethane;
1,1-bis(3-tert-butyl-5-methyl-2-hydroxyphenyl)propane;
1,1-bis(3-tert-butyl-5-methyl-2-hydroxyphenyl)isobutane;
1,1-bis(3-methyl-5-tert-butyl-6-hydroxyphenyl)methane;
1,1-bis(3,5-ditert-butyl-4-methoxyphenyl);
3,5-di-tert-butyl-4-methylphenyl)methane;
1,1-bis(3,5-di-tert-butyl-4-hydroxyphenyl)ether;
4,4'-thio-bis(6-tert-butyl-o-cresol)
and mixtures thereof.

The oil-soluble 2-thiaalkyl phosphono compounds represented by Formula B are prepared by reacting a mercaptan or mercaptide having at least 6 carbon atoms with a halomethylphosphono compound such as chloromethylphosphonic acid or chloromethylphosphonate or their thia derivatives in a suitable solvent, such as an aqueous alcoholic solution, at reflux temperature and under inert conditions until the reaction is completed which normally requires up to 5 days. The mercaptans include aliphatic mercaptans, such as hexyl, octyl, decyl, dodecyl, octadecyl mercaptans, cycloalkyl mercaptans, such as cyclohexyl mercaptan, dicyclohexyl mercaptan, aralkyl mercaptan, such as phenyldecyl mercaptan, benzyl mercaptan, and the like. Instead of the mercaptans, the mercaptides can be used such as the alkali metal (Na or K) mercaptides of the above compounds. Suitable halomethylphosphonic compounds include chloromethylphosphonic acid, mono-or di-hydrocarbyl chloromethylphosphonates, e.g., mono or dibutyl chloromethylphosphonate, mono- or di-2-ethylhexyl chloromethylphosphonate, mono- or di-lauryl chloromethylphosphonate, mono- or di-phenyl chloromethylphosphonate, mono- or di-cyclohexyl chloromethylphosphonate, mono- or di-benzyl chloromethylphosphonate, dibutyl dithiochloromethylphosphonate, diphenyl chloromethyl dithiophosphonate, dibutyl chloromethyltrithiophosphonate, alkali metal salts such as Na and K salts of chloromethylphosphonic acid, Na and K salts of monobutyl chloromethylphosphonic acid, Na and K salts of monodecyl chloromethylphosphonic acid, and the like.

A preferred method of making the 2-thiaalkylphosphonates is to react a suitable mercapto compound, such as an alkali metal (Na or K) $C_{10-18}$ alkyl mercaptide, with an alkali metal (Na or K) salt of chloromethylphosphonic acid in an alcoholic solution under reflux conditions and under an inert atmosphere to form the alkali metal salt of an alkylmercaptomethylphosphonic acid. The salt is then treated with a strong acid such as hydrochloric acid to spring the free alkylmercaptomethylphosphonic acid, which can be converted into desired partial or full esters or polyvalent metal salts or amine salts, for oil, fuel, and grease additives as well as other uses.

The following examples illustrate the preparation of additives for use in accordance with the present invention.

EXAMPLE I

Stoichiometric amounts of the potassium salt of decyl mercaptan and monochloromethylphosphonic acid were dispersed in an aqueous solution of ethyl alcohol and the mixture was refluxed at 78° C. under a nitrogen atmosphere for about 1 day. The potassium decylmercaptomethylphosphonate was then treated with strong hydrochloric acid to spring the free phosphonic acid which was recovered by extraction with ether. The final product, decylmercaptomethylphosphonic acid, analyzed as follows:

| | Percent C | Percent H | Percent S | Percent P | Equip. Wt., 1st Hydrogen | Equiv. Wt., Both Hydrogens |
|---|---|---|---|---|---|---|
| Found | 49.1 | 9.4 | 12.0 | 11.2 | 261 | 132 |
| Expected | 49.2 | 9.4 | 11.94 | 11.54 | 268.3 | 134.1 |

EXAMPLE II

The procedure of Example I was followed except that potassium salt of phenylmercaptan was used instead of potassium salt of decylmercaptan and the final product was phenylmercaptomethylphosphonic acid.

EXAMPLE III

The n-butyl ester of decylmercaptomethylphosphonic acid of Example I was prepared by treating decylmercaptomethylphosphonic acid with n-butyl alcohol in an alcohol solution at about 60° and extracting the ester with ether.

EXAMPLE IV

Di-2-ethylhexylamine salt of decylmercaptomethylphosphonic acid (2-thiadodecylphosphonic acid) was prepared by mixing the product of Example I with di-2-ethylhexylamine in an amount sufficient to neutralize completely both acid groups, at room temperature to form the amine salt.

EXAMPLE V

Following the procedure of Example IV, the tert-octadecylamine salt of dodecylmercaptomethylphosphonic acid was prepared using tert-octadecylamine, available commercial under the trade-name of Primene JM-R, instead of di-2-ethylhexylamine.

The following additional compounds were prepared: octylmercaptomethylphosphonic acid, dodecylmercaptomethylphosphonic acid, cyclohexylmercaptomethylphosphonic acid, benzylmercaptomethylphosphonic acid, phenylmercaptomethylphosphonic acid, monobutyl and dibutyl decylmercaptomethylphosphonate, phenyldecylmercaptomethyl acid phosphonate, dithiobutyl dodecylmercaptomethylphosphonate, dibutyl phenylmercaptomethylphosphonate, dithiooctyl cyclohexylmercaptomethylthiophosphonate, dioctylamine dodecylmercaptomethylphosphonate, dioctadecylamine phenylmercaptomethylphosphonate, tert-octadecylamine dodecylmercaptomethylphosphonate, and mixtures thereof.

Liquid hydrocarbons which are improved by the incorporation of minor amounts of each of the additives of this invention include gasoline, jet fuels, transformer oils, turbine oils, mineral lubricating oils, and industrial oils such as cutting fluids, quenching fluids, etc. The antioxidant and stabilizing additive combination of this invention is particularly useful in highly refined mineral oils of the lubricating oil viscosity range (SAE 10W–SAE 90) from which natural occurring oxidation inhibitors have been removed by refining. Additionally, synthetic hydrocarbon oils and resins such as olefin polymers, e.g., copolymers of ethylene/propylene, copolymer of isobutylene/octadecene, copolymer of isobutylene/styrene, etc., as well as synthetic oils of the ester type, e.g., di-2-ethylhexylsebacate, etc., and soap- or clay- or dye-gelled greases can be improved by the additive combination of this invention.

The above phosphono compounds are normally employed as extreme pressure and anti-wear agents rather than as anti-oxidants. However, this combination of the phosphono compounds seems to augment the anti-oxidant properties of the phenolic compounds.

The pronounced superior and unexpected results obtained by use of the additive combination of the invention of the invention are demonstrated by results of evaluations of the additives in a refined mineral white oil[1], using the Dornte Oxidation Stability Test (National Petroleum News, September 17, 1941, pages R–294–296); the results are shown in Table I.

TABLE I

[Temperature, 150° C.; iron catalyst]

| Additive | Induction Period (Hrs.) |
|---|---|
| (1) None | a 0.3 (0.9) |
| (2) 0.6% 1,1-bis(3,5-di-tert-butyl-4-hydroxyphenyl) methane | 17.5 |
| (3) 0.3% 1,1-bis(3,5-di-tert-butyl-4-hydroxyphenyl) methane | 11 |
| (4) 0.2% 2,6-di-tert-butyl-4-methylolphenol | a 27.5 |
| (5) 0.6% monobutyl decylmercaptomethylphosphonate | 48 |
| (6) 0.3% monobutyl decylmercaptomethylphosphonate | 8 |
| (7) 0.3% 1,1-bis(3,5-di-tert-butyl-4-hydroxyphenyl) methane + 0.3% monobutyl decylmercaptomethyl-phosphonate | 186 |
| (8) 0.1% monobutyl decylmercaptomethylphosphonate + 0.1% 2,6-di-tert-butyl-4-methylolphenol | a 79 | a Without catalyst.

Other representative compositions of this invention which are similarly effective are:

(9) Mineral oil+0.15% 1,1-bis(3,5-di-tert-butyl-4-hydroxyphenyl)methane+0.15% decylmercaptomethylphosphonic acid

(10) Mineral oil+0.5% 1,1-bis(3,5-di-tert-butyl-4-hydroxyphenyl) methane+0.5% dibutyl decylmercaptomethylphosphonate

(11) Mineral oil+0.6% 2,6-di-tert-butyl-4-methylolphenol+0.6% monobutyl decylmercaptomethylphosphonate

(12) Fuel oil+0.15% 1,1-bis(3,5-di-tert-butyl-4-hydroxyphenyl ethane+0.15% 2,6-di-tert-butyl-4-methylol+0.3% monobutyl decylmercaptomethylphosphonate

(13) Gasoline+0.05% 1,1-bis(3-isopropyl-5-tert-butyl-

---

[1] Mineral oil in compositions 1 through 11 was a white oil having the following properties: Gr. ° API, 29–31; color, 30 min.; PP, ° F., max. 15; flash, COC ° F., min. 420; vis., SUS at 100° F., 345–355; unsap. res., min. 98.

4-hydroxyphenyl) methane+0.05% dodecylmercaptomethylphosphonic acid

(15) Di-2-ethylhexyl sebacate+0.15% 1,1-bis(3-methyl-5-tert-butyl-4-hydroxyphenyl)methane+0.15% monobutyl decylmercaptomethylphosphonate From the results presented in Table I, it can be seen that for equal total additive concentration compositions of the present invention (7 and 8) are from 5 to 10 times as stable as similar compositions, but which contain only the phenolic material (2 to 4) or only the thiamethylphosphono compound (5 and 6). Similarly effective results are observed for compositions 9 to 14 of this invention.

Compositions of this invention are useful for providing stability and other desired properties to petroleum products such as mineral lubricating oils which also contain small amounts (0.1% to 3%) of other agents such as corrosion inhibitors, e.g., metal dithiophosphates such as Zn di-2-ethylhexyl dithiophosphate; detergents such as metal organic sulfonates, e.g., neutral or basic Ca, Ba, or Zn petroleum sulfonates; anti-wear agents such as metal thiocarbamates, e.g., Zn, Cr, or Ca dibutyl or diamyl dithiocarbamate; viscosity-index improvers and pour point depressants such as the oil-soluble polymethacrylates available under the name "Acryloids" and, specifically, "Acryloid" 150, 618, 710 and 768, described in U.S. Patent 2,710,842; condensation products of chlorinated paraffin wax and naphthalene; extreme pressure agents such as aliphatic amine salts of mono-or trichloromethanephosphonic acid, or the ester or amide of such acids; organic sulfides and mixtures thereof.

We claim as our invention:

1. A lubricating oil composition comprising a major amount of mineral lubricating oil and from 0.05% to about 5% each of an oil-soluble alkylmercaptomethylphosphono compound having the general formula

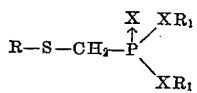

wherein R is an oil-soluble $C_{10-18}$ alkyl radical, the $R_1$'s are selected independently from the group consisting of hydrogen, $C_{6-12}$ hydrocarbyl radical, and alkyl amine, and X is oxygen and an oil-soluble dialkyl substituted p,p'- methane bisphenol the alkyl radicals containing 4 to 8 carbon atoms.

2. A lubricating oil composition comprising a major amount of mineral lubricating oil and from about 0.05% to about 5% of a $C_{10-18}$ alkylmercaptomethylphosphonic acid and 1,1-bis(3,5-di-tert-alkyl-4-hydroxyphenyl)methane the alkyl radicals containing 4 to 8 carbon atoms.

3. A lubricating oil composition comprising a major amount of mineral lubricating oil and from about 0.05% to about 5% each of a $C_{6-12}$ alkyl ester of $C_{10-18}$ alkylmercaptomethylphosphonic acid and 1,1-bis(3,5-di-tert-alkyl-4-hydroxyphenyl)methane the alkyl radicals containing 4 to 8 carbon atoms.

4. A lubricating oil composition comprising a major amount of mineral lubricating oil and from about 0.05% to about 5% each of an aliphatic amine salt of $C_{10-18}$ alkylmercaptomethylphosphonic acid and 1,1-bis(3,5-di-tert-alkyl-4-hydroxyphenyl)methane the alkyl radicals containing 4 to 8 carbon atoms.

5. A lubricating oil composition comprising a major amount of mineral lubricating oil and from about 0.05% to about 5% each of decylmercaptomethylphosphonic acid and 1,1-bis(3,5-di-tert-butyl-4-hydroxyphenyl)methane.

6. A lubricating oil composition comprising a major amount of mineral lubricating oil and from about 0.05% to about 5% each of a $C_{6-12}$ alkyl ester of decylmercaptomethylphosphonic acid and 1,1-bis(3,5-di-tert-butyl-4-hydroxyphenyl)methane.

7. A lubricating oil composition comprising a major amount of mineral lubricating oil and from about 0.05% to about 5% each of monobutyl decylmercaptomethylphosphonate and 1,1-bis(3,5-di-tert-butyl-4-hydroxyphenyl)methane.

8. A lubricating oil composition comprising a major amount of mineral lubricating oil and from about 0.05% to about 5% each of dibutyl decylmercaptomethylphosphonate and 1,1-bis(3,5-di-tert-butyl-4-hydroxyphenyl)methane.

References Cited in the file of this patent

UNITED STATES PATENTS

| | | |
|---|---|---|
| 2,535,174 | Tawney | Dec. 26, 1950 |
| 2,724,718 | Stiles et al. | Nov. 22, 1955 |
| 2,807,653 | Filbey et al. | Sept. 24, 1957 |